United States Patent [19]

Patterson et al.

[11] Patent Number: 4,708,846
[45] Date of Patent: Nov. 24, 1987

[54] BWR CRITICAL-POWER-ENHANCING WATER ROD (85-EN-3)

[75] Inventors: John F. Patterson; Robert B. MacDuff; Jack Yates, all of Richland, Wash.

[73] Assignee: Exxon Nuclear Company, Inc., Bellevue, Wash.

[21] Appl. No.: 850,104

[22] Filed: Apr. 10, 1986

[51] Int. Cl.⁴ .............................................. G21C 3/32
[52] U.S. Cl. .................................. 376/444; 376/435; 376/443
[58] Field of Search ....................... 376/444, 435, 443

[56] References Cited

U.S. PATENT DOCUMENTS 3,205,147 9/1965 Foure .................... 376/444
3,453,178 7/1969 Winkler ................. 376/444
3,861,999 1/1975 Zmola .................... 376/444
4,089,742 5/1978 Amanal ................... 376/444

Primary Examiner—Donald P. Walsh
Attorney, Agent, or Firm—Volker R. Ulbrich; Robert Keith Sharp

[57] ABSTRACT

This invention is directed to a fuel assembly for boiling water reactors incorporating an advanced type of "water rod."

11 Claims, 5 Drawing Figures

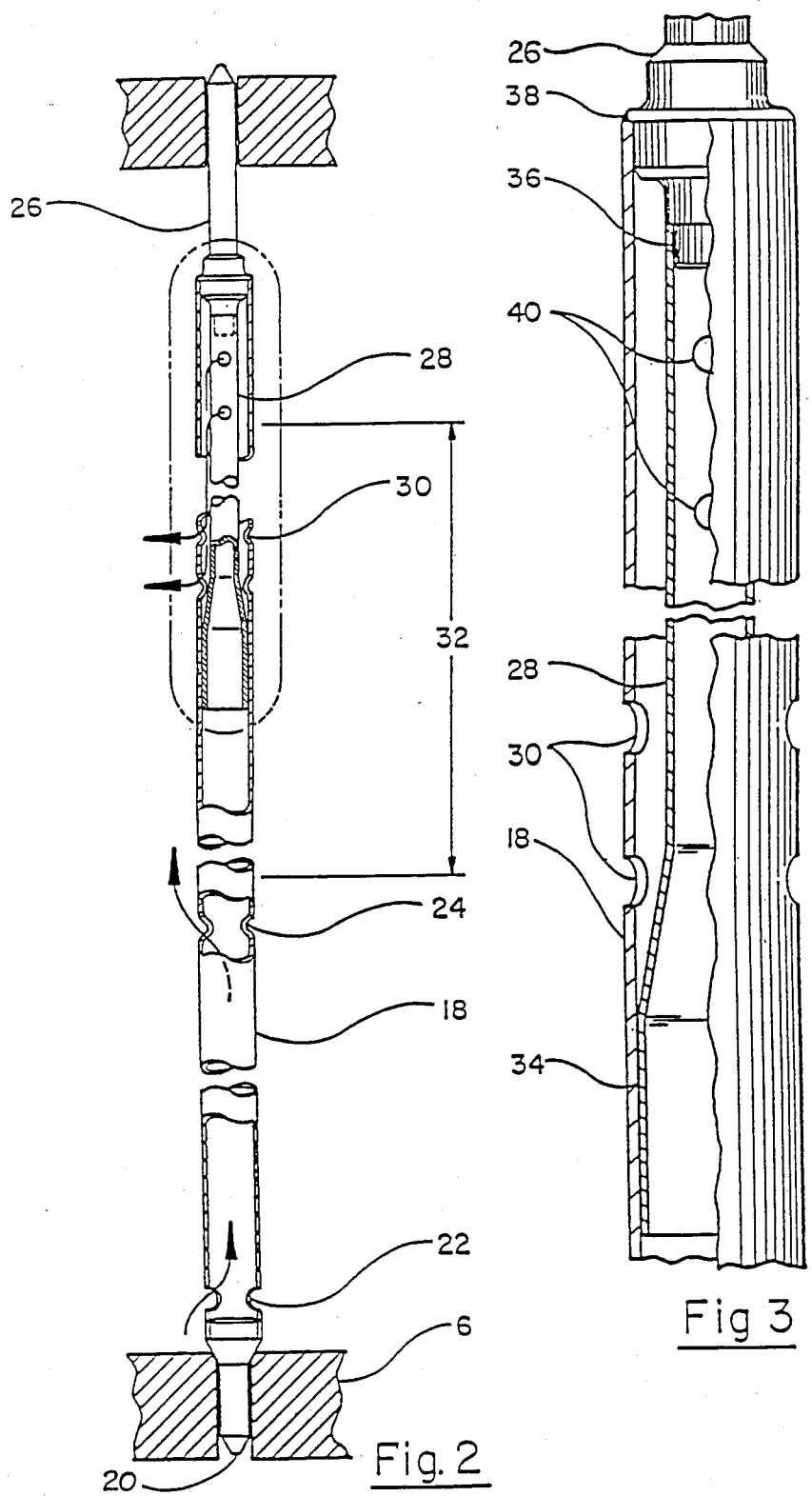

BWR CRITICAL-POWER-ENHANCING WATER ROD (85-EN-3)

INTRODUCTION

The design of fuel assemblies for boiling water nuclear reactors presents special problems not present in pressurized water reactors. In a BWR, a portion of the core is necessarily occupied by a mixture of water and steam, which, because of its lower density and, therefore, lower spacial concentration of hydrogen atoms, possesses a lesser moderating effect on neutrons than does a core completely filled with liquid water, such as is present in a pressurized water reactor. It has, therefore, become the practice to include in each assembly for a BWR one or more "water rods," i.e., tubes through which liquid water flows. These enhance the moderating effect of the assembly.

Another special problem for boiling water reactors resides in the lesser cooling power of the mixture of water and steam present in the upper portion of the reactor core. The coefficient of heat transfer between the fuel elements and steam is significantly less than that between the fuel elements and boiling water. This gives rise to a critical heat transfer zone in the upper portion, which determines the maximum power that can safely be generated by the reactor, termed the "critical power." When the "water rods" are in their simplest form, i.e., open at the bottom and the top, the water passing through them, while effective as a moderator, is relatively ineffective as a coolant. This bypass of a significant portion of the moderator-coolant restricts the number of water rods that may be used in a given fuel assembly. It has been proposed, e.g. in U.S. Pat. No. 3,802,995 granted Apr. 9, 1974, to James R. Fritz and Frederick R. Channon, to provide outlet holes in the water rods to permit flow from them into the space between the fuel rods to enhance the cooling power of the assembly. However, a significant fraction of the water emerges from the top of the rod, and of the assembly, and thus bypasses the zone where maximum cooling is needed.

SUMMARY OF THE INVENTION

This invention involves an assembly provided with "water rods," in which the total length of the rod is used for moderating purposes, and the total flow through the rod is used for cooling, the coolant being introduced particularly in the upper zone, where the critical fuel rod heat transfer region exists. This critical region extends from about 60% to 80% of the height of the assembly, measured from the bottom. To this end, the water rod, which is preferably made larger than the fuel rods of the assembly, has a closed upper end and an inner tube reaching nearly to that end. Surrounding the inner tube is a reverse-flow annulus, through which water flows downwardly to an exit hole provided in the upper portion of the assembly, and from which water flows and mingles with the coolant surrounding the fuel rods. This increases the number of water rods that may be used in an assembly, and therefore, achieves optimum moderation and also optimum cooling of the assembly, raising the critical power level, i.e. the power level at which boiling adjacent some fuel rods changes from nucleate to film, with possible damage to those rods.

Injection of subcooled water rod coolant, i.e., water below its boiling point, into the critical heat transfer region of the assembly improves the heat transfer. Tests show that for a fixed total coolant flow through a fuel bundle, the critical power of the bundle is increased with increasing injection flow. In other words, the best heat transfer performance is achieved by diverting the maximum amount of inlet bundle coolant flow into the water rods and later injecting it into the critical heat transfer region of the core.

Other considerations limit the number of fuel rods which may be replaced by water rods, so that there is an optimum number of water rods, which will vary with the particular reactor. With our type of water rods, optimum number of water rods per assembly and the maximum bundle power output are greater than for prior designs.

BRIEF DESCRIPTION OF THE DRAWINGS

In the drawing,

FIG. 2 is a vertical section of one form of our water rod.

FIG. 3 is a vertical section of the upper portion of the water rod shown in FIG. 2 or FIG. 4.

DETAILED DESCRIPTION

Figure 1:
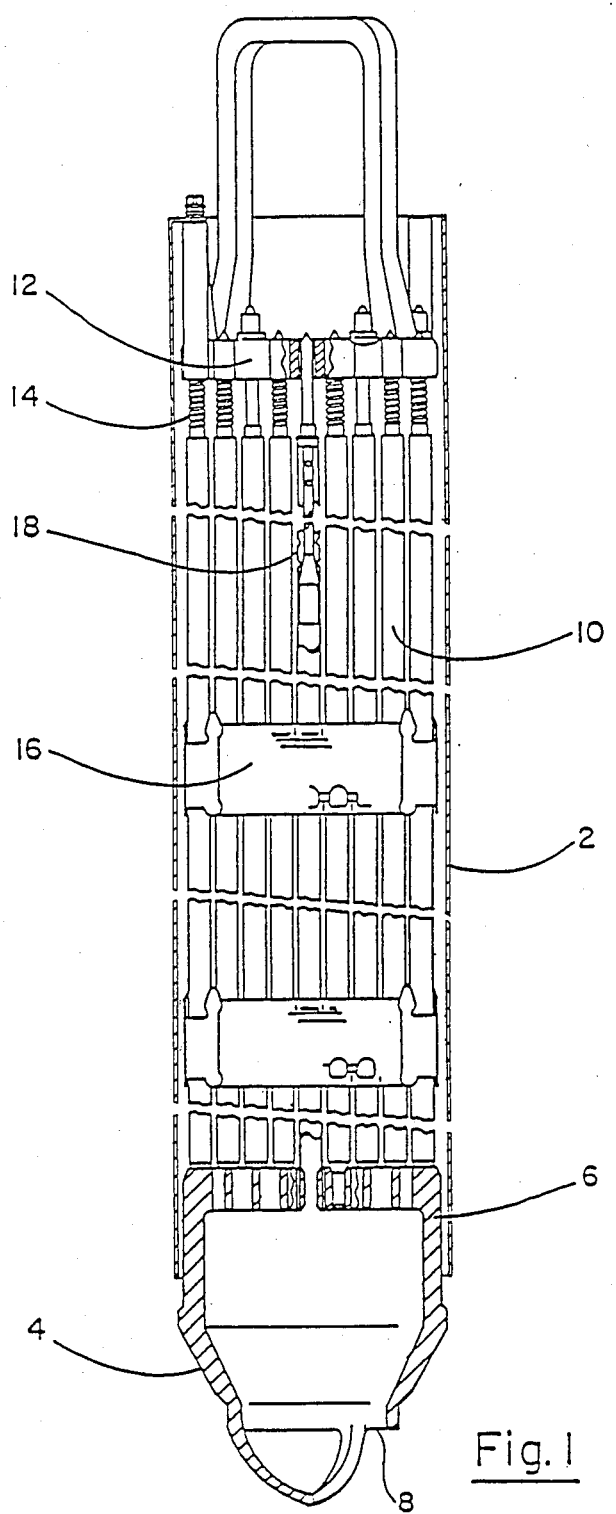
FIG. 1 is a vertical section of a boiling water reactor fuel assembly incorporating our new water rods.

Referring to the drawing, FIG. 1 shows a vertical section of a boiling water fuel assembly incorporating one of our improved water rods. The assembly comprises an outer flow channel 2. At the bottom is an inlet nozzle 4 which supports a lower tie plate 6, and which has, at its lower end, an opening 8 for the reception of cooling water. Within the flow channel 2 are a large number of fuel rods 10, which are supported at their lower ends on lower tie plate 6. The upper ends extend into an upper tie plate 12. Springs 14 are compressed between the fuel rods and the upper tie plate. The fuel rods 10 are held spaced from one another by grid spacers 16.

The structure described thus far is typical of boiling water reactors in general. Our assembly includes one, and often several, water rods 18, one form of which is shown in more detail in FIGS. 2 and 3. In this embodiment, the lower end of the tube 18 is closed by an end plug 20, which rests on lower tie plate 6. Immediately above the tie plate are a plurality of inlet openings 22, through which assembly cooling water enters the water rod. A plurality of intermediate exit holes 24 are provided preferably somewhat above the midpoint of the tube and near the lower end of the critical heat transfer zone 32. The upper end of the water rod is closed by an end plug 26. Within the upper portion of the water tube is an inner tube 28, which is open at or near its top. Near the lower end of tube 28 are a plurality of exit openings 30 in tube 18. These are located at or near the midpoint of the critical heat transfer zone referred to above, and shown at 32.

The upper portion of tube 18 is shown in more detail in FIG. 3. As shown in that figure, the lower end of inner tube 28 is flared outwardly at 34. This flared portion is originally made with a diameter the same as the internal diameter of tube 18. At several points in its periphery, it is deformed outwardly to a diameter which gives an interference fit with the inner surface of 18. The upper end is welded at 36 to end plug 26, and the inner end 34 is then forced downwardly to the point where end plug 26 fits within tube 18. The latter is then welded at 38 to the end plug. As shown, inner tube 28 is provided with several holes 40 near its upper end.

In operation, cooling water from the assembly flows inward through openings 22. Some of it exits through intermediate outlets 24. The remainder flows upwardly, passing through inner tube 28 and out through holes 40, then downwardly and out through exit openings 30. As described above, the openings 30 are positioned so that the water flowing outwardly through them enters the critical heat transfer zone of the assembly.

Figures 4, 5:
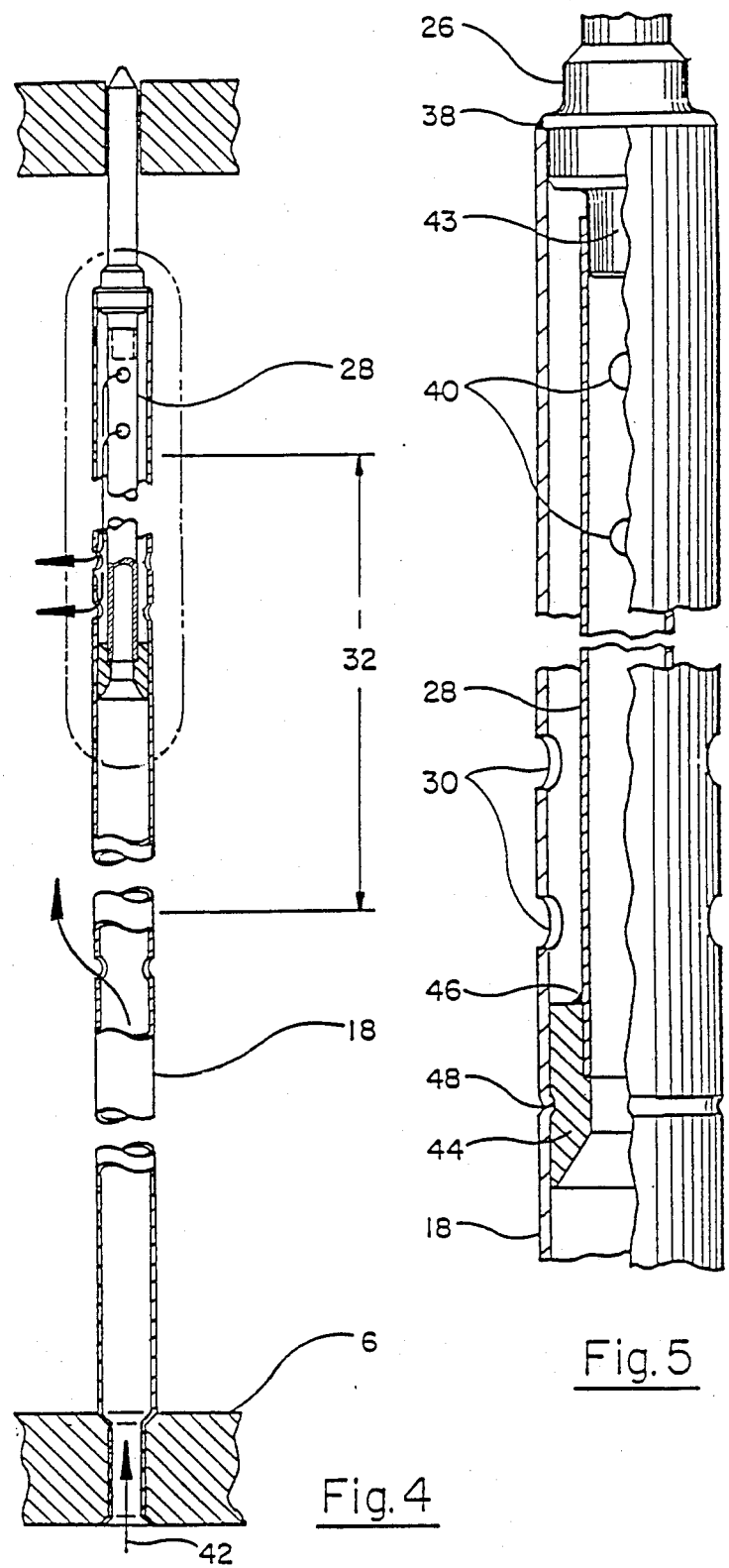
FIG. 4 is a vertical section of another form of our water rod.
FIG. 5 is a vertical section of another form of the upper portion of the water rod shown in FIG. 2 or FIG. 4.

FIG. 4 shows an alternate form of "water rod," which is the one we prefer at present. In this embodiment, the tube 18 extends through the lower tie plate 6, and has an open lower end through which water enters directly from the coolant supply zone of the reactor, as shown by arrow 42. The remainder of the structure is the same as in FIG. 2 and either FIG. 4 or FIG. 5.

This arrangement gives a greater water flow through a tube of a given size than that of FIG. 2.

FIG. 5 shows an alternate upper end structure, appliable to either the embodiment of FIG. 2 or that of FIG. 4. In assembling it, the tube 28 is dimensioned so as to have a tight fit on reduced portion 43 of end plug 26. It is welded into inner plug 44 at 46. Plug 44 has a peripheral groove 48. After tube 28 has been pushed onto end cap 26, the assemblage is pushed into tube 18. The latter is then deformed into groove 48 and welded at 38 to end plug 26.

While we have shown the intermediate openings 24 at only a single level, in practice there will be multiple holes distributed over several inches of the tube 18. The same is true of the upper openings 30. The intermediate openings should be positioned in the range of about 50% to about 65%, and the upper openings in the range of about 65% to about 75% of the height of the assembly, measured from the bottom. The two sets of openings should be spaced a substantial distance apart, e.g., 10% of the height of the assembly.

While we have described various details of our structure, it will be apparent to those skilled in the art that various changes can be made. We therefore wish our invention to be limited solely by the scope of the appended claims.

What is claimed is:

1. A fuel assembly for a boiling water reactor comprising a group of vertical, parallel, elongated fueld tubes containing a fissionable material, said assembly having a critical heat transfer zone in its upper portion; at least one water tube parallel to said fuel tubes and located among them, said water tube having an inlet adjacent its lower end; means closing the upper end of said water tube; an inner tube within the upper portion of said water tube having a lower end in sealing relationship with the inner surface of said water tube, forming an annulus with said water tube and having at least one opening adjacent its upper end; at least one upper exit opening in said water tube above the lower end of said inner tube and located within the critical heat transfer zone of said assembly, whereby water will flow upwardly through said water tube, upwardly through said inner tube, then downwardly through said water tube annulus and out through said upper exit opening, into the critical heat transfer zone of said assembly.

2. An assembly as defined in claim 1, and further including an intermediate exit opening in said water tube adjacent the lower end of said critical heat transfer zone.

3. An assembly as defined in claim 2, wherein said intermediate exit opening is located in the range of about 50% to about 65% of the height of the fuel assembly measured from the bottom.

4. An assembly as defined in claim 3, wherein said upper exit opening is located in the range of about 65% to about 75% of the height of the assembly measured from the bottom, said intermediate and upper exit openings being spaced a substantial distance apart.

5. An assembly as defined in claim 1, wherein said water tube extends through a lower tie plate of said assembly, and is open at its lower end.

6. An assembly as defined in claim 2, wherein said water tube extends through a lower tie plate in said assembly and is open at its lower end.

7. An assembly as defined in claim 3, wherein said water tube extends through a lower tie plate of said assembly and is open at its lower end.

8. An assembly as defined in claim 4, wherein said water tube extends through a lower tie plate of said assembly and is open at its lower end.

9. An assembly as defined in claim 1, and comprising an upper end plug, closing said water tube and said inner tube, both said tubes being joined to said end plug, and said inner tube being provided with openings near its upper end.

10. An assembly as defined in claim 9, wherein said inner tube is flared at its lower end into sealing engagement with said water tube.

11. An assembly as defined in claim 9, wherein said inner tube is secured at its lower end to an inner plug which seals said water tube.

* * * * *